United States Patent
Isaacson et al.

(10) Patent No.: US 8,582,463 B2
(45) Date of Patent: Nov. 12, 2013

(54) CONTACT MANAGEMENT AND COMMUNICATION

(76) Inventors: Cory M. Isaacson, Broomfield, CO (US); Alfred William Zlogar, Menlo Park, CA (US)

( * ) Notice: Subject to any disclaimer, the term of this patent is extended or adjusted under 35 U.S.C. 154(b) by 196 days.

(21) Appl. No.: 13/010,768

(22) Filed: Jan. 20, 2011

(65) Prior Publication Data

US 2011/0205938 A1 Aug. 25, 2011

Related U.S. Application Data

(60) Provisional application No. 61/296,802, filed on Jan. 20, 2010.

(51) Int. Cl.
*H04L 12/28* (2006.01)
*H04J 1/16* (2006.01)

(52) U.S. Cl.
USPC ............ 370/252; 370/389; 370/386; 370/401

(58) Field of Classification Search
USPC .................................. 370/252, 389, 386, 401
See application file for complete search history.

(56) References Cited

U.S. PATENT DOCUMENTS

| | | |
|---|---|---|
| 6,754,181 B1 | 6/2004 | Elliott et al. |
| 2006/0056385 A1 | 3/2006 | Fotta et al. |
| 2006/0291504 A1 | 12/2006 | Cohn |
| 2008/0133580 A1 | 6/2008 | Wanless et al. |
| 2008/0319823 A1 | 12/2008 | Ahn et al. |
| 2009/0103693 A1 | 4/2009 | Katis et al. |
| 2009/0210631 A1* | 8/2009 | Bosworth et al. ............. 711/141 |
| 2012/0149347 A1* | 6/2012 | Scott et al. .................... 455/415 |

OTHER PUBLICATIONS

International Search Report, International Publication No. WO 2011/091187, Appl. No. PCT/US2011/021950, International Filing Date Jan. 21, 2011, Date of Mailing Search Report Mar. 29, 2011, 2 pages.
Written Opinion of the International Searching Authority, International Publication No. WO 2011/091187, Appl. No. PCT/US2011/021950, International Filing Date Jan. 21, 2011, Date of Mailing Written Opinion Mar. 29, 2011, 14 pages.
Office action mailed Jan. 20, 2011 for related U.S. Appl. No. 13/010,771.

* cited by examiner

*Primary Examiner* — John Pezzlo
(74) *Attorney, Agent, or Firm* — Hamilton, DeSantis & Cha LLP; Thomas J. Osborne, Jr.

(57) ABSTRACT

A system and method for managing contact information is provided. In one implementation, for example, a method comprises accessing a contact record associated with a user of a user communication device, the contact record comprising at least one originating identifier identifying the user communication device and at least one contact field identifying contact information of a contact associated with the user. A contact record map is generated in which an alias identifier is assigned for the contact record. A destination identifier is selected from a plurality of available destination identifiers and assigned to the contact associated with the user. The assigned destination identifier is unique with respect to other contacts associated with the user. The alias identifier and the destination identifier are to the origination identifier identifying the user communication device within the contact record map.

25 Claims, 6 Drawing Sheets

CONTACT MANAGEMENT AND COMMUNICATION

CROSS-REFERENCE TO RELATED APPLICATIONS

This application claims the benefit of U.S. provisional application No. 61/296,802, filed 20 Jan. 2010, which is hereby incorporated by reference as though fully set forth herein.

DETAILED DESCRIPTIONS

A system and method for managing contact information and allowing communication between users is provided. In one implementation, conventional telephone numbers are eliminated by providing a "call button" that may be used to identify a user. The call button comprises a contact record including an alias identifier and one or more actual contact fields (e.g., one or more telephone numbers, email addresses, text messaging addresses, or other accessible addresses). The call button, for example, may hide an owner's telephone number, messaging address, email address, or other contact information under an alias identifier while still allowing another user to contact the owner of the call button. A call button may also allow a user to control multiple telephone numbers in a single call button. The user, for example, may establish a priority order among telephone numbers included in a call button (which may be reconfigurable at will). When another user attempts to connect through the call button, the system may try each of those numbers sequentially until the user is reached at one of the numbers associated with the call button.

A call button can be permanent or temporary and may be used for any number of purposes, such as personal identifiers, business listings, work groups, social networks, want ads, travel, dating, family, special events, parties, conference calls, and more.

A user can create multiple alias identifiers for one or more call buttons, while maintaining any combination of underlying contact information (e.g., telephone number and messaging/email address). In one implementation, a call button is highly configurable. For example, a user can add identifiable information to the call button, such as photos, titles, links, or the like to the call button. The user can also register the call button for inclusion in a public or private listing (e.g., a directory service "411" listing). In one such implementation, for example, the user can configure the call button as a virtual mini web page accessible to anyone in the world or to anyone within a private or public listing (e.g., via a text-based directory search).

A call button conceals underlying contact information, showing only information chosen by a user (e.g., an alias identifier, with or without a description, chosen by a user). Call buttons can be tailored for any use, such as personal identifiers, business listings, work groups, social networks, want ads, real estate listings, hobbies, travel, dating, party invitations, family, special events, parties, conference calls, and more. Call Buttons can also be used to invoke business functionality provided by any business such as product purchases, travel reservations, requesting proposal quotations, product information requests, etc.

The call button and its alias identifier can be sent electronically between users, such as by text message, instant message or email. A recipient of a call button can then add the call button to a contact list (e.g., a mobile phone, email, or messaging contact list). In one implementation, for example, the recipient can then make voice or message contact with one-click reaching the user wherever in the world they may be.

A user can control inbound traffic (e.g., voice, text, and email messages) through a variety of voice mail and message response options provided by an application. The application can provide the nature and identity of an inbound call or message, can answer immediately, put an inbound call on hold, block inbound calls or messages, and/or send a custom response (e.g., a custom voice mail, text message, or email response).

A contact manager can allow users to arrange their call buttons into categories for convenient access to commonly used call buttons (e.g., family contacts, business contact, social contacts, etc.).

In one implementation, a user can create a group call button that includes a list of a plurality of other call buttons (member call buttons). A group call button allows a user to send a message or recorded voice message to all member call buttons with a single click.

Data analytics can be performed on call button names, descriptions, classifications, group call button members providing access to advertisers from a variety of means. Data analytics from this information can be utilized by advertisers and marketing research analysts to identify target markets or customers for a variety of services. One example of data analytics that may be used herein is described in detail in U.S. patent application Ser. No. 12/435,338 entitled "Semantic Analytical Search and Database" filed by Nikolai N. Liachenko et al. on May 4, 2009, which is incorporated by reference in its entirety as if it had been fully included herein.

Advertisers can create call buttons for promoting specific products, services or offerings. These call buttons can be published to group call buttons that that contain highly targeted prospects for such services. Additionally advertisers can publish their call buttons in the 411, yellow page, or other directory service, allowing users to find out about their products and services, make direct purchases, and perform other types of business related services (request more information, make travel reservations, etc.). Advertiser call buttons can interact with the business systems of the advertisers, through the call button messaging, voice capabilities, or direct system-to-system interactions over a network such as the Internet (e.g., Web services or other similar mechanisms).

In one particular implementation, for example, an advertiser may send a message or push a call button out to members of group call buttons (e.g., members of the advertiser's group call button or members of a call button group that may be related to the content of the advertiser). For example, an advertiser selling after-market automobile product may push a call button to members of car aficionado call button groups. An actionable call button may be forwarded, for example, that allows the recipient to call the advertiser, link to a web site, buy a product directly, request more information, subscribe for further messages, or the like.

In another particular implementation, an advertiser may publish a call button for a particular product. A hotel in a particular resort town, for example, may publish a call button for a hotel room. Where a room reservation is canceled or the hotel has vacancy, for example, the hotel may post a call button that is easily searchable by potential customers. The call button may allow for refined and/or narrative searches by a user. In the hotel example, a user that needs a room may search for a hotel room, find the call button, and be connected to the hotel to book the room. Content of the call button may allow for individualized searches (e.g., by category), such as allowing a user to search for a non-smoking, pet-friendly room within a particular price range that is available on a particular date.

In one particular implementation, for example, a call button is associated with an item for sale, such as a boat. The call button may be forwarded to various groups, users, accessible through a directory or listing or otherwise accessible to users interested in purchasing or accessing information about the boat. If the call button is set up to allow a recipient to call the owner of the call button, for example, a DID for the owner of the call button is allocated to the recipient, and the recipient may directly call the owner of the boat using the call button and without the recipient ever being given access to the direct telephone number of the call button owner. When the call button owner receives the call, the call is identified by the name of the call button (e.g., "The Boat"). If the owner does not take the call, the call can be forwarded to voice mail. In one implementation, the call button owner has a separate voice mail box associated with the particular voice mail. The separate voice mail, for example, can identify particular information about the boat and it's offer for sale and can be used to keep track of inquiries for that particular call button.

Similarly, a user may publish a call button to request a service or product from a vendor. A homeowner that has an emergency, such as a broken pipe, may search for a group call button requesting 24-hour plumbing services, and send a text or voice message to all local companies that are members of that group call button. A plumbing company monitoring this message may be alerted to the potential customer and be able to contact the customer directly to bid for the project.

Similarly, an auctioneer (or other vendor) may send out a call button to pre-qualified potential bidders or purchasers. The call button, for example, may include information about an item being auctioned, terms and conditions, and any other pertinent information. A user that receives the information and wants to bid may simply use the call button to contact the auctioneer directly and place a bid.

Figure 1:
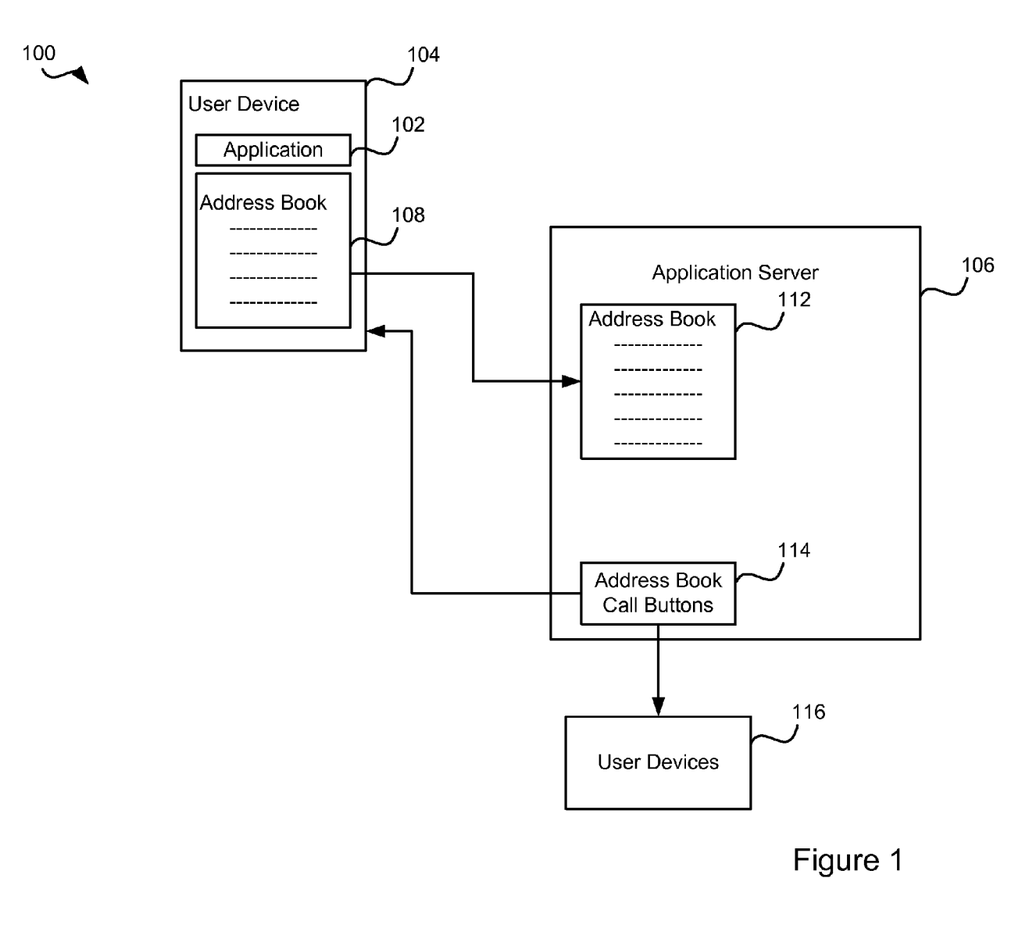
FIG. 1 illustrates an example implementation of a system in which a user can set up a call button.

FIG. 1 shows an example implementation of a system 100 in which a user can set up a call button. In the system shown in FIG. 1, for example, the user downloads an application 102 for a user device 104 (e.g., for a mobile telephone, personal digital assistant, personal computer, tablet computer, or the like) from an application server 106. In one particular implementation, for example, the application 102 may comprise an application for a smart phone on a standardized platform, such as the iPhone, Blackberry, Symbian, or Android platform.

The application 102 can synchronize (e.g., automatically or manually) with an address book 108 of the user device 104 and creates a primary contact call button for that user. The application may then, for example, request configuration information (e.g., a title for the primary call button, what alias identifier to use for the call button, whether to include links, photos, or other customizations, and whether to list the call button in one or more public or private directories). The application also allows the user to enter any contact information desired for the call button. The call button information is then sent to the application server, where it is stored as a call button. The call button is returned to the user that created the call button, and is available for distribution to a plurality of users, without exposing the actual underlying contact information.

In the implementation shown in FIG. 1, the user device 104 comprises an address book 108 in which contacts are maintained for use on the device. The address book records are copied to an application server 106 as address book records 112 resident on the application server 106. The application server 106 generates call buttons 114 for each of the entries copied from the user device 104 and sends the generated call buttons back to the user device 104 for access by the application resident on the user device 104.

In one particular implementation, the application server 106 creates a call button for one or more contacts in the user's address book 112. The application server 106 can then send a message (e.g., text or email message) to other user devices 116 each of the selected contacts notifying them that the user has created a call button for their contact information. The application server 106 can also invite the individual contacts to manage their particular call buttons by downloading an application as described above. Thus, the other user can be invited to sign up with the application server and manage the call button to edit the call button, add additional information to the call button or create new call buttons.

A user can also send his or her call button to another user to allow the recipient to contact the sender using the call button. The sending user can send the call button, for example, to the recipient to an address book contact, to an individual call button the sender has already received (e.g., send the user's call button to the call button representing the recipient that the user already has access to), by distributing the call button to members of a group or other targeted call button, by updating his or her own call button that may have already been received by the recipient, or other methods of forwarding.

In one particular implementation, a user creates a particular call button, such as a listing for sale of a boat. In this implementation, for example, the user creates a boat call button. The user then obtains a link to the boat call button from the application server 106. The user can share the link to the boat call button with other users, such as via email or any web page. The user can also publish the call button on a social networking site that includes the link to the call button. A second user interested in the boat, can see the link and click on it.

Where the interested party is not a registered user of a call button application, the party can enter his or her actual phone number or other personal identifier (e.g., email address). An SMS (or other message such as an email message) is sent to the interested party that contains a link to the call button. The interested party clicks on the link in the message and the call button is displayed (e.g., via a browser). The party can view all the call button content, dial the provided DID (e.g., for the user or for a conference call related to the listing) based on the settings provided in the call button by the originating user. In this implementation, DIDs can be allocated for the interested party even though the user is not registered with the call button application.

If the interested party is registered with the call button application, however, the call button can be sent directly to the interested party (e.g., to a dashboard or other location within a call button application). The interested party can view the call button and/or call the originating user of the listing directly from the call button. In one implementation, the interested party has the option of "accepting" the call button, in which case all future updates to the call button are sent to the interested party and the user can participate in messaging (e.g., text, voice or other messaging) to the originating party, the entire group or one or more individual members of the group. Thus, a registered member of the call button application can accept the call button to access further communication options that need not be available to non-registered members of the call button application.

In another implementation, a call button may be registered to a searchable list directory (e.g., a 411 directory). In this implementation, a user interested in finding information related to a particular subject enters search terms (or otherwise searches for) into a searchable directory. In response, a list of call buttons relevant to the search is provided to the searching user. If the user selects a particular call button, the user can view it, dial a conference call, call the owner, or perform other actions related to the call button depending upon the settings assigned to the call button by its owner. When the page is selected 411 directory numbers (e.g., one or two dedicated DIDs) can be allocated to the user dynamically when the page is selected. A telephone switch that receives the call recognizes the user CID, and the directory or conference DID for that user. The switch looks up the current directory page for the CID/DID combination and routes the call accordingly. If desired, the user can request the call button for delivery via a dashboard or other delivery method, making the user a member of the page.

Figure 2:
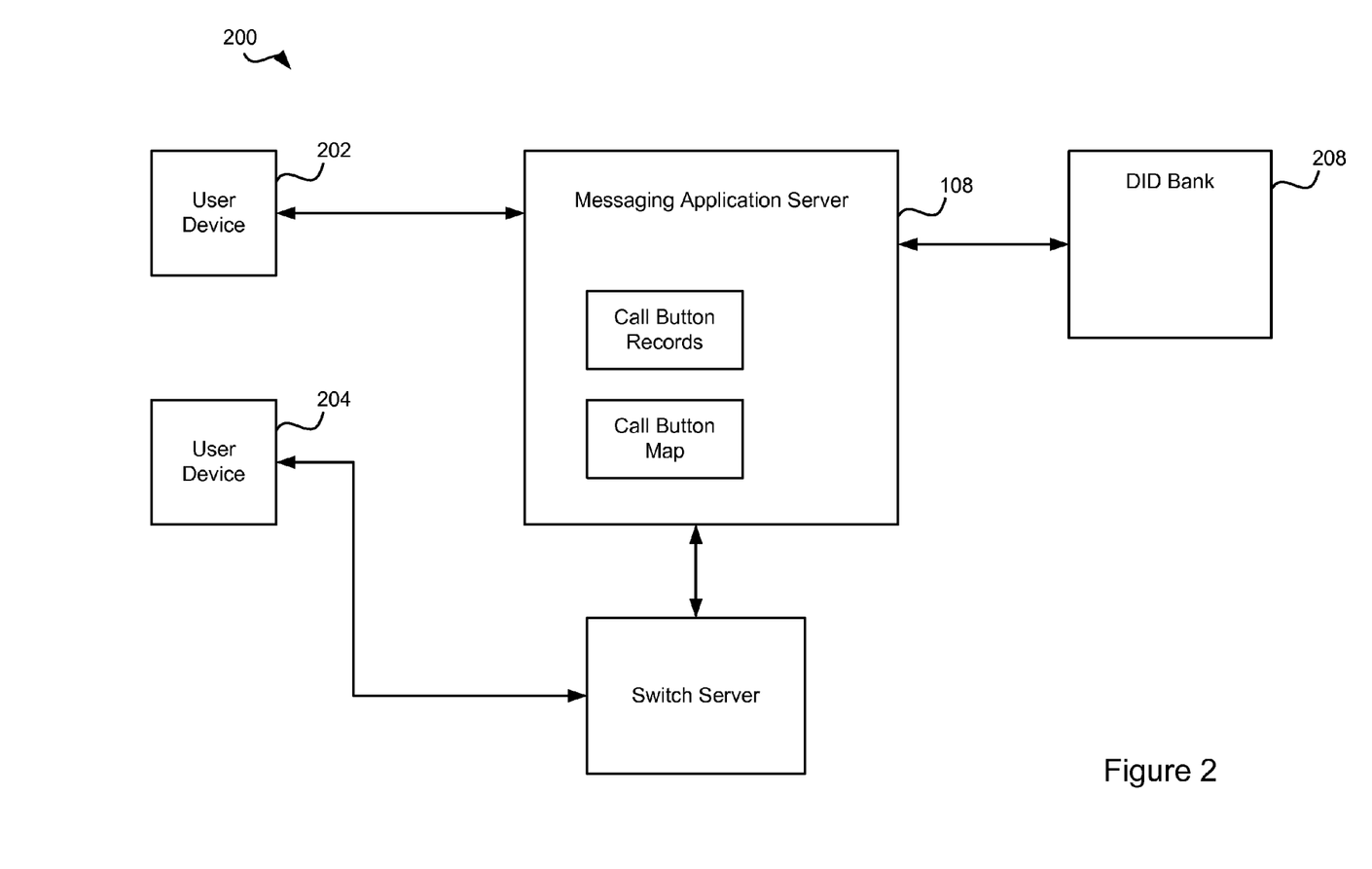
FIG. 2 illustrates an example implementation of a system for managing call buttons assigned to a plurality of users.

FIG. 2 shows an example implementation of a system 200 for managing call buttons assigned to a plurality of users (e.g., a first user device 202 and a second user device 204). In the example shown in FIG. 2, the first user device 202 forwards its call button to a messaging application server 206. The messaging application server 206 manages call buttons for the plurality of users. In one particular implementation, for example, the messaging application server maintains call button contact records as well as a call button map for each of the plurality of users having at least one assigned call button. A telephone switch or messaging server can retrieve a call button from the call button map, based on the caller identifier and an alias phone number assigned to a specific user designating the target call button. Once the call button is retrieved, the telephone switch or message server can obtain the actual target call button details, allowing the phone call, conference call or message to be transmitted to the target end user's actual phone numbers while maintaining total privacy of the target end user. The call button contact records, for example, may comprise a list of actual contact fields (e.g., telephone numbers, email addresses, messaging addresses, and the like). An example contact record, for example, may comprise the following:

Call Button
User 1
   Telephone number 1 for user 1
   Type for telephone number 1 (e.g., mobile)
   Telephone number 2 for user 1
   Type for telephone number 2 (e.g., home)
   Email address 1 for user 1
   Email address 2 for user 1
   Messaging address 1 for user 1
User 2
   Telephone number 1 for user 2
   Telephone number 2 for user 2
   Telephone number 3 for user 2
   Email address 1 for user 2

The system 200 further includes a direct inward dialing (DID) bank 208 that includes a list of all DID's available to the messaging system for assigning within call button contact records of the system. By mapping individual DID's to caller identifiers (CID's), a unique combination may be made for each communication without having to consume DID's for every call button of the system 200. Thus, individual DID's from the DID bank 208 can be assigned to individual contacts for a particular user device, but can be reused for different user devices. Thus, the number of DID's assigned to the DID bank 208 is related to the number of contacts stored within the user devices instead of the total number of user devices that may use the system 200.

The first user 202 forwards its call button and contact information for the second user 204 to the messaging application server 206. The messaging application server 206 maps the call button of the first user 202 with a call button of the second user 202 and a DID from the DID bank that is unique to any DID already assigned to another contact stored within the user device of the first user 202. The messaging application server 206 also maps a reverse connection for the second user 204 to contact the first user 202. A call button map can also be used for a call button created by a user with the user's own contact information. This effectively allows the user to contact himself, but more importantly allows the user to share the call button with others. An example of a call button map is as follows:

| Call Button Map | | |
|---|---|---|
| User 202 | DID | User 204 |
| User 204 | DID | User 202 |

By storing the call button maps on the application servers and not on the user devices, the contact information of various users may be hidden from other users that only need a call button identifier to contact a particular user. Further, call button contact records may be updated without requiring updating individual records stored on various user devices. Thus, by updating a call button contact record, a user may change his or her contact information without having to notify each individual user on the system.

In another implementation, the user can request a dynamic allocation of the DID for a Call Button. This is done by sending a network request with the CID of the user and the name or other identifier of the Call Button to the Messaging Server, which returns a dynamically allocated DID to the user. The user's mobile device can then dial the DID using a standard PSTN phone call, and the switch server will recognize the dynamically allocated DID and process the call accordingly.

In another variation of the dynamically allocated DID, the user can be performing the call using voice over IP (VOIP). In this case, the CID number can be sent as usual to identify the user, and the CID text value can be set to the unique call button name or other identifier. In this case, the switch server will use the inbound CID to identify the user, and the CID text value to identify the call button requested. This variation avoids a network lookup prior to the call as described above.

Figure 3:
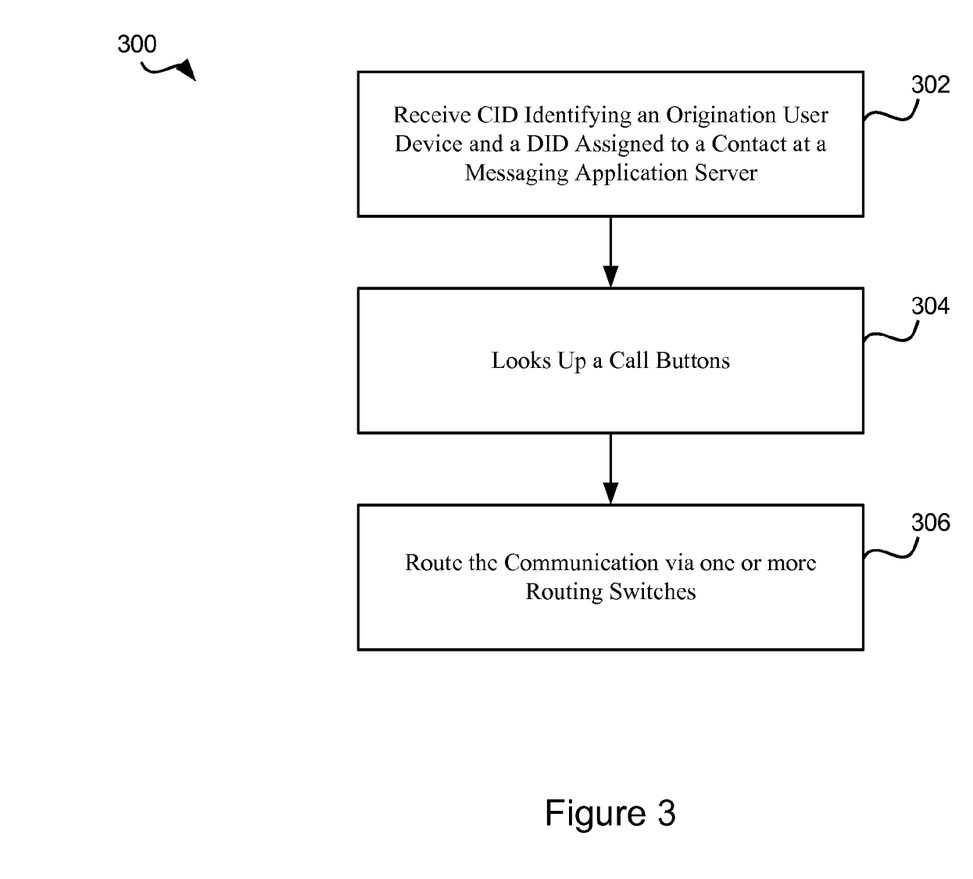
FIG. 3 illustrates example block diagram of operations that may be performed by a messaging server to route a communication request through one or more switches using a call button.

FIG. 3 shows an example block diagram of operations 300 that may be performed by a messaging server to route a communication request through one or more switches using a call button. In operation 302, a caller identification (CID) identifying an origination user device for the communication request and a DID assigned to a contact within the origination user device are received at a telephone switch. The telephone switch can retrieve the call button using an optimized call button map index, stored locally or available through the application server Messages can be sent in a similar fashion, using the CID and DID as identifiers to uniquely identify a call button. The messaging application server looks up a call button for the origination and destination user devices within a call button map in operation 304. An example implementation of a call button map is shown as follows:

| CID | DID | Call Button ID | Reverse DID |
|---|---|---|---|
| 818-555-1212 | 303-555-5544 | 10 | 303-555-6677 |

In this particular implementation of a call button map, a CID record provides a caller identification of a communication originating user device, and a DID record provides a direct inward dialing identifier (from a DID bank) assigned to a particular contact on that user device. The call button map further comprises a call button identifier record corresponding to the CID-DID pair identifying a communication between the originating user device and a user device of the corresponding contact from the originating user device. The call button map further includes a reverse DID showing how the recipient of this particular communication would contact the originating user device in another communication.

Once the messaging application server has retrieved the call button from the call button map or from the call button index (a portion of which can be stored on each telephone switch server), the telephone switch server can route the communication via one or more routing switches in operation 306. The communication is represented to the recipient user device using the reverse DID assigned within the recipient user device to a contact corresponding to the user device originating the communication.

The use of the DID's assigned to contacts within the user devices allows the system to conceal the true CID associated with a particular user device. Although the operations are described with respect to CIDs and DIDs, other identification codes may also be used (e.g., a unique text identifier such as a call button name).

Figure 4:
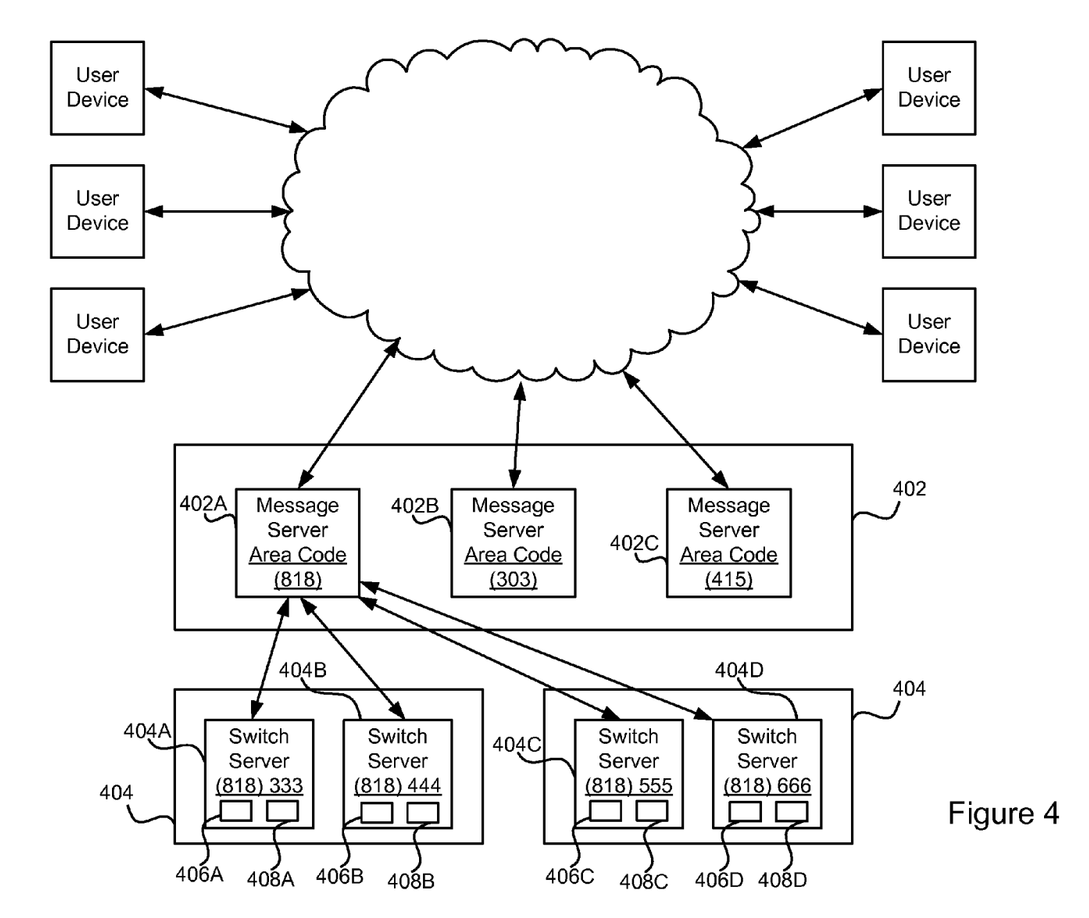
FIG. 4 illustrates an example implementation of a distributed system for routing messages or calls using call buttons.

FIG. 4 shows an example implementation of a distributed system 400 for routing messages or calls using call buttons. In this particular implementation, for example, call button maps can be partitioned and indexed for fast access across the distributed system 400.

Call button mapping in a system supporting many users with multiple call buttons each can become resource intensive. In one particular embodiment, for example, compressed, partitioned indices of the call button map across a plurality of messaging and telephone switch servers 402 are provided. Thus, each messaging or telephone switch server 402 need only route communications for a portion of the system. Further, the messaging or telephone switch servers 402 may be dynamically configurable to respond to various traffic patterns to further enhance the efficiency of the routing through the distributed system 400. The messaging and telephone switch servers 402 themselves may be implemented within one or more data centers or implemented virtually within a cloud computing environment.

In the particular implementation shown in FIG. 4, the messaging servers 402 are assigned by one or more area codes although other divisions are possible. In this particular embodiment, messaging server 402A is assigned to area code 818 while messaging server 402B is assigned to area code 303 and messaging server 402C is assigned to area code 415. In this particular example, a call button map stored on or accessible by the individual messaging servers 402A through 402C may be divided so that only data relative to a particular area code need be stored within a particular server. The telephone switch servers may also be similarly divided. In one particular implementation centrally located messaging servers may be divided as part of a "sharded" database system, and telephone switch servers may be distributed, such as in multiple carrier locations, in which only limited data needs to be distributed to each server. Accordingly, computational resources needed to process communication requests at a particular server are minimized versus accessing a full call button map for an entire system.

FIG. 4 shows the messaging servers 402A through 402C as merely examples. Any number of servers may be assigned any number of area codes or may be divided by one or more other configurations. Further, the assignments may be dynamically reconfigurable to adjust to traffic patterns and/or resource availability.

FIG. 4 also shows a plurality of switch servers 404 corresponding to a particular area code assigned to the messaging server 402A. The switch servers 404A through 404D can retrieve information from any of the messaging servers 402. In the particular implementation of FIG. 4, for example, the switch servers 404A through 404D are subdivided by area code and prefix of a DID telephone number. The switch servers 404A through 404D can be co-located within a CLEC (e.g., connected to typical CLEC routing systems) or may be distributed among a plurality of CLECs to route communications.

Call button and map data may be distributed to the switch servers 404. The switch servers 404 can use the call button and map data to control their routing accordingly. In one particular implementation, the switch servers can also make a remote request to a messaging server (or a remote database) to remotely retrieve call button and map data. For example, where a call button or map cannot be found within the switch server or where the information stored within the switch server is out of date, the switch server may retrieve the correct information. Where data is distributed asynchronously to the switch servers, for example, a given switch server may not have the most recent data.

In one particular implementation, the system may partition call buttons and/or call button maps. For example, an entire set of call buttons 406A through 406D can be distributed to each switch server in the system 400, while only the portion of the call button map 408A through 408D that impact the operation of a given switch server is distributed to that switch server. In addition, where an individual user does not have any contacts in a given area code or prefix, a corresponding messaging server and/or switch server may not have to be aware of a call button for that user. In addition, switch servers can retrieve information needed from other switch servers to support any type of partitioning for performance. Again, the subdivision of the switch servers 404A through 404D allows synchronization of individual portions of a call button map at the individual switch servers 404A through 404D. By merely synchronizing a portion of a database at a particular switch server, the synchronization of the database across a plurality of messaging servers 402A through 402C and across a plurality of individual switch servers 404A through 404D can be performed much more quickly and using fewer computational resources than if a full copy of the database was synchronized across the system. One example of a distributed "sharding" database synchronization using pipelines is described in further detail in U.S. patent application Ser. No. 12/568,629 entitled "Scalable Relational Database Replication" and filed by Cory M. Isaacson et al. on Sep. 28, 2009, which is incorporated by reference in its entirety as if it had been fully included herein.

In one particular implementation, for example, a total of 10,000 DIDs may be assigned to a given system in a DID bank, although any number of DIDs may be used. Thus, the DIDs and reverse DIDs in this implementation can each be represented by a two-byte integer. Similarly, the CIDs can also be represented by a two-byte integer. Up to four billion call buttons can be represented by a four byte integer. Thus, in this particular example, an entire record of a call button map can be represented by a compact form.

As described above, the individual call button map records can be distributed across individual switch servers 404 of the system 400 with a shared index across the system. In one particular implementation, for example, an area code and a prefix of a CID may be filtered. In this implementation, the area code and prefix may be stored in a tree structure to avoid duplication. The unique four-digit portion of the CID can then be stored as a two-byte integer. Such an index allows for elimination of repeating values and compression of the data.

As described above, where usage of a particular switch server increases past a predetermined usage (e.g., above 80% usage), a new switch server may be manually or dynamically started, and traffic loads manually or dynamically rebalanced across the plurality of active switch servers.

Conventional conference bridges rely on hardware-based ports, with a "cap" of the number of ports accessible from a single bridge server. This means that users of the bridge must have access to a large overage of ports to ensure they will have enough capacity for conference calls. It also places a limit of the maximum number of users that can be supported on a single bridge. If users need to connect multiple bridges together to expand capacity, they must specify pre-configured links to do so (in other words, the bridges are fixed in that configuration of coupling).

In a new implementation, all conference ports are software based, on generic commodity servers. These servers may be tied to one another to expand conference capacity in any configuration needed at runtime on a dynamic basis. No hardware ports or other limitations are required.

Prior technology for large conference calls (e.g., for a large training session or corporate meeting with hundreds or thousands of participants) requires that users be invited to the conference call with pre-determined roles (moderator, speaker, or listen-only participant). These users must be given a passcode prior to the conference call, which is a complex task (the right passcode for each role must be given to each group of users in advance). Users must know and use the right passcode to enter the conference. Further, if listen-only participants wish to speak or ask a question, they must do so with an IVR code, and the moderator must use either a separate Web interface or a cumbersome IVR command set to review the queue of such requests.

Figure 5:
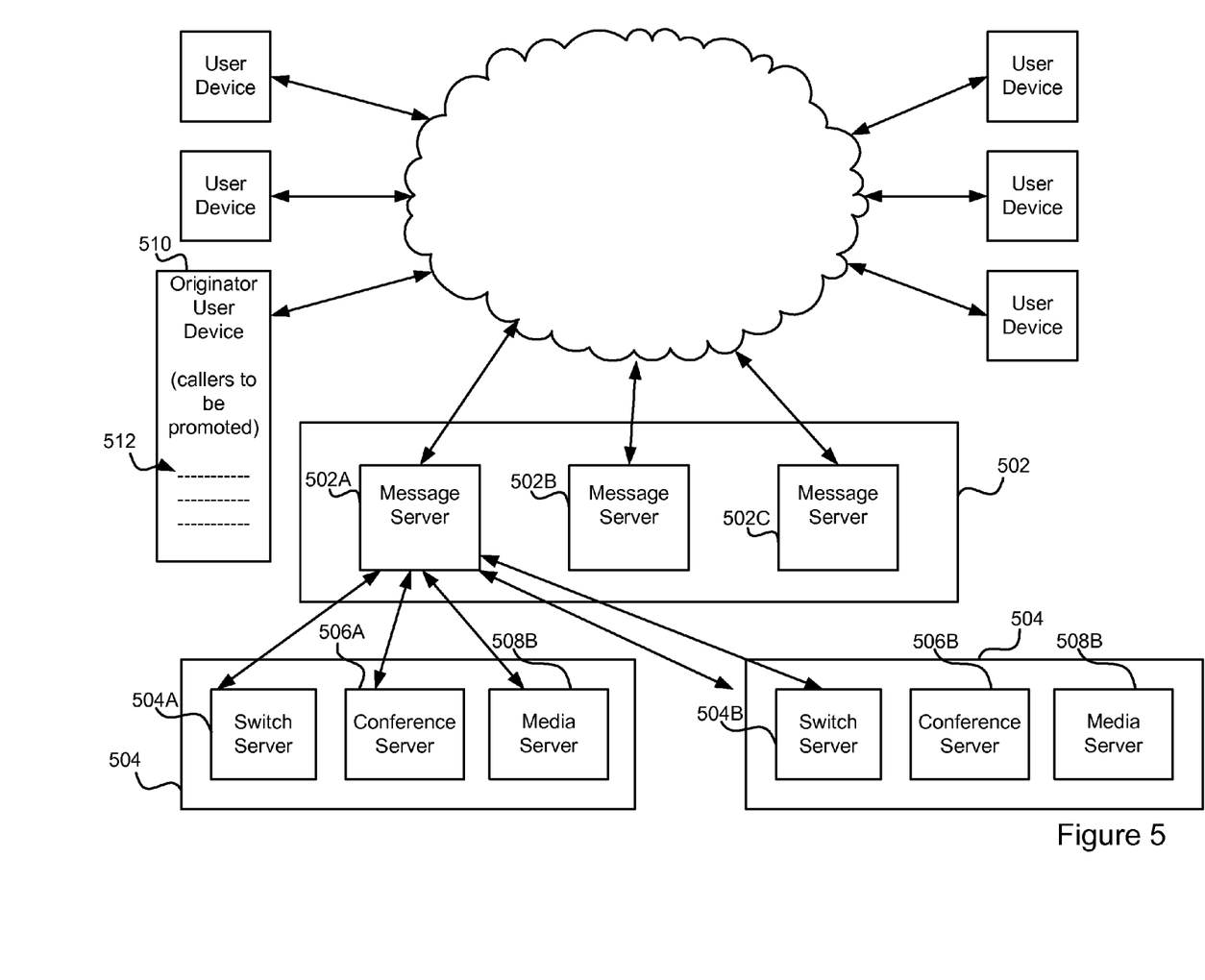
FIG. 5 illustrates another example implementation of a distributed system for hosting a conference call.

In one particular implementation, such as shown in FIG. 5, users can participate in a large conference call without any predefined roles, and without needing any passcode for entry into the conference call. The conference call is identified by a CID/DID combination of a call button, allowing one-touch dialing without error to attend the call. Listen-only participants hear a stream of the conference on one or more media servers 508, and can be promoted at any time to actually enter the live conference on main conference server 506A or other conference servers (e.g., server 506B). If a user other than the originator or moderator of the conference wishes to speak during the call or ask a question, they can use an IVR keystroke, a text message, or a special call button to indicate that they wish to do so. The originator of the call or another moderator of the call can select the call button (e.g., on their mobile device 510), and view a list of participants 512 that are requesting to speak or ask a question. Each such participant can be identified by their call button name. The originator or other moderator can then select one or more participants to promote their role to that of speaker, either for the duration of the call or temporarily (by later demoting their role back to listen-only participant (manually or automatically)). This allows full management of the call all from the originator's or other moderator's mobile device, without the need of a computer or other Web-based device or complex IVR commands to manage the request queue.

In some implementations, for example, such a system may be dynamic without requiring any pre-determined hardware configuration, provide the ability to conduct large conference calls without any pre-defined roles (or a limited number of roles (e.g., one or more originator and the remaining participants), provide conference calls in which a passcode is not required and the calls are identified through call button switching (CID/DID), and/or provide conference call management from a mobile device, which can be anywhere the originator is located.

Figure 6:
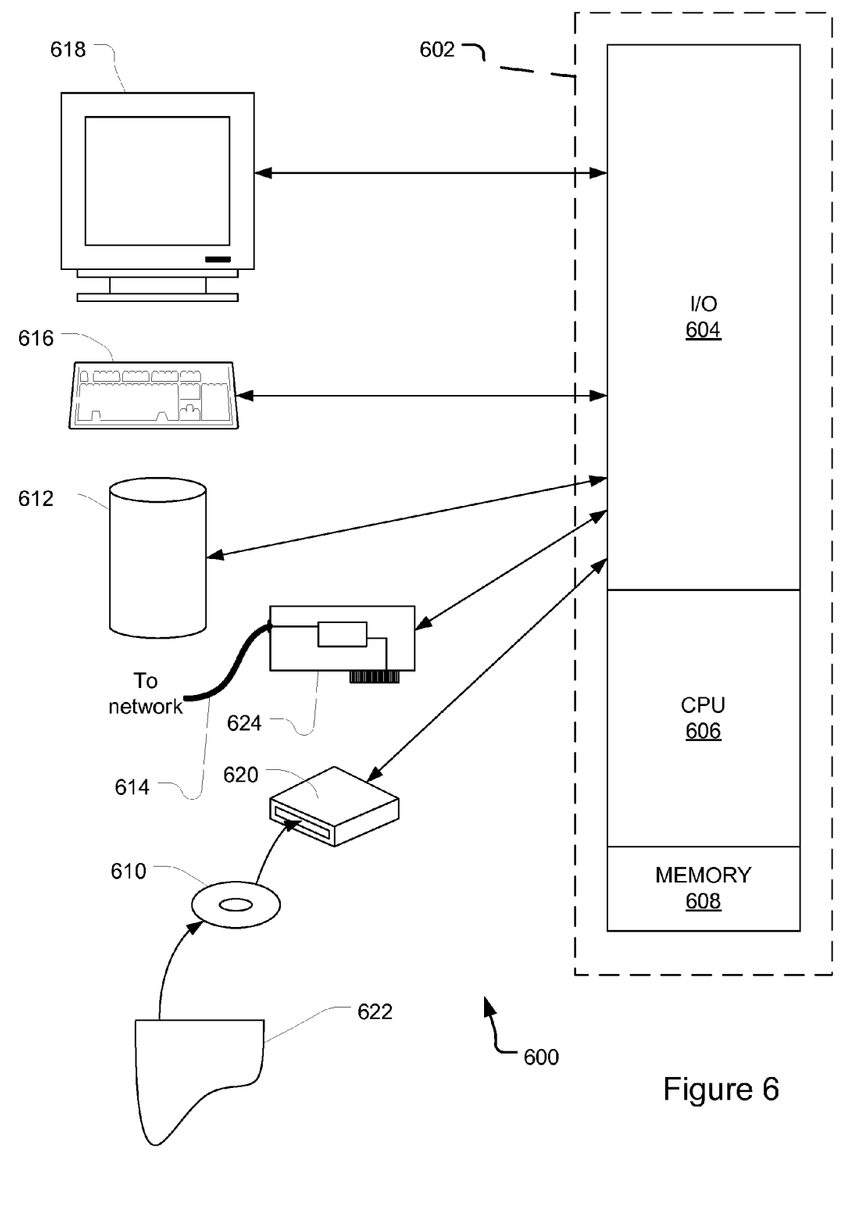
FIG. 6 illustrates an example system useful in implementations of the described technology.

FIG. 6 illustrates an exemplary system useful in implementations of the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 into a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 608, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In accordance with an implementation, software instructions and data directed toward operating the subsystems may reside on the disk storage unit 612, disk drive unit 620 or other storage medium units coupled to the computer system. Said software instructions may also be executed by CPU 606.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

The invention claimed is:

1. A method comprising:
    accessing a contact record associated with a user of a user communication device using a processor, the contact record comprising at least one originating identifier identifying the user communication device and at least one contact field identifying contact information of a contact associated with the user;
    generating a contact record map for the contact record, wherein generating the contact record map comprises:
        assigning an alias identifier for the contact record,
        assigning a destination identifier selected from a plurality of available destination identifiers to the contact associated with the user, wherein the assigned destination identifier is unique with respect to other contacts associated with the user, and
        mapping the alias identifier and the destination identifier to the origination identifier identifying the user communication device within the contact record map; and
    storing the contact record map in a computer-readable medium accessible by a processor for identifying contact records for received communication requests using the contact record map.

2. The method of claim 1 wherein the originating identifier comprises a caller identification (CID) identifier and the destination identifier comprises a first direct inward dialing (DID) identifier.

3. The method of claim 1 wherein the operation of generating a contact record map comprises associating a reverse identifier selected from the plurality of available destination identifiers with the contact associated with the user, and mapping the reverse identifier to the alias identifier, the destination identifier, and the origination identifier identifying the user communication device within the contact record map.

4. The method of claim 3 wherein the alias identifier and the selected destination identifier are provided to the user communication device.

5. The method of claim 4 wherein the alias identifier and the selected destination identifier are stored in an address book of the user communication device such that a source of an incoming communication can be identified at the user communication device.

6. The method of claim 3 wherein reverse identifier stored in the contact record map is provided to a destination communication device so that the destination device will recognize the reverse identifier from its address book.

7. The method of claim 3 further comprises:
    receiving a request at a server for a communication between the user communication device and another communication device, the request including the originating identifier and the selected destination identifier;
    identifying a contact record and a reverse identifier using the contact record map; and
    using the contact record to establish the communication, wherein the reverse identifier is provided to a destination communication device so that the destination device will recognize the reverse identifier from its address book.

8. The method of claim 1 wherein the alias identifier and the selected destination identifier are provided to the user communication device.

9. The method of claim 8 wherein the alias identifier and the selected destination identifier are stored in an address book of the user communication device.

10. The method of claim 1 further comprises:
    receiving a request at a server for a communication between the user communication device and another communication device, the request including the originating identifier and the selected destination identifier;
    identifying a contact record using the contact record map; and using the contact record to establish the communication.

11. The method of claim 10 wherein the communication comprises a voice communication.

12. The method of claim 11 wherein the voice communication comprises a voice over Internet Protocol (VOIP) communication.

13. The method of claim 10 wherein the communication comprises a text-based communication.

14. The method of claim 10 wherein the text-based communication comprises an SMS text communication.

15. The method of claim 1 wherein the originating user device comprises a mobile communication device.

16. The method of claim 1 wherein the contact record corresponds to an identified conference call.

17. The method of claim 1 wherein the contact record corresponds to a product or service.

18. The method of claim 1 wherein the contact record comprises a group contact record identifying a plurality of users.

19. The method of claim 16 wherein the alias identifier and the selected destination identifier associated with the group contact record are provided to the plurality of users identified in the group contact record.

20. The method of claim 1 wherein the selected destination identifier is dynamically assigned in response to a received communication request.

21. The method of claim 1 wherein the selected destination identifier is statically assigned to the contact.

22. The method of claim 1 wherein the destination identifier is dynamically assigned to a directory listing contact record and a call relating to that directory listing contact record is connected based on a combination of the dynamically assigned destination identifier and the originating identifier.

23. A non-transitory computer-readable medium encoding a computer program for operation on a processor to perform operations comprising:
   accessing a contact record associated with a user of a user communication device, the contact record comprising at least one originating identifier identifying the user communication device and at least one contact field identifying contact information of a contact associated with the user;
   generating a contact record map for the contact record, wherein generating the contact record map comprises:
      assigning an alias identifier for the contact record,
      assigning a destination identifier selected from a plurality of available destination identifiers to the contact associated with the user, wherein the assigned destination identifier is unique with respect to other contacts associated with the user, and
      mapping the alias identifier and the destination identifier to the origination identifier identifying the user communication device within the contact record map.

24. A system comprising:
   a server configured to establish communications between user communication devices;
   a plurality of contact records accessible by the server, each contact record associated with a user of a user communication device, the contact record comprising at least one originating identifier identifying the user communication device and at least one contact field identifying contact information of a contact associated with the user;
   a contact record map accessible by the server, the contact record map comprising an alias identifier, a destination identifier selected from a plurality of available destination identifiers, and an origination identifier mapped for each contact record, wherein the assigned destination identifier is unique with respect to other contacts for the user.

25. A method comprising:
   receiving an alias identifier and a destination identifier for a contact record stored on a user communication device, the destination identifier being unique with respect to other contact records stored on the user communication device;
   storing the alias identifier and the destination identifier on the user communication device for access by a processor of the user communication device;
   generating a communication request using a processor of the user communication device in response to a selection of the contact record, the communication request comprising the alias identifier and the destination identifier; and
   transmitting the communication request from the user communication device, wherein the alias identifier and the destination identifier shield actual contact information from being accessible via the user communication device and the alias identifier and the destination identifier mapped to the alias identifier and the destination identifier on a server.

* * * * *